(12) United States Patent
Rokenbrodt et al.

(10) Patent No.: US 9,375,987 B2
(45) Date of Patent: Jun. 28, 2016

(54) CONNECTOR DEVICE FOR PROVIDING ACCESS TO ELECTRICAL POWER

(71) Applicant: Lamrok Outdoor Products LLC, Wind Lake, WI (US)

(72) Inventors: Kevin Elwood Rokenbrodt, Oak Creek, WI (US); Michael Jerome Lambert, Wind Lake, WI (US)

(73) Assignee: Lamrok Outdoor Products LLC, Wind Lake, WI (US)

( * ) Notice: Subject to any disclaimer, the term of this patent is extended or adjusted under 35 U.S.C. 154(b) by 257 days.

(21) Appl. No.: 14/033,204

(22) Filed: Sep. 20, 2013

(65) Prior Publication Data

US 2015/0084504 A1   Mar. 26, 2015

(51) Int. Cl.
*B60Q 1/14* (2006.01)
*B60Q 1/26* (2006.01)
*B60D 1/64* (2006.01)
*H05B 37/02* (2006.01)
*H05B 33/08* (2006.01)

(52) U.S. Cl.
CPC .............. *B60D 1/64* (2013.01); *H05B 33/0806* (2013.01); *H05B 37/02* (2013.01)

(58) Field of Classification Search
USPC .................................................... 315/76–84
See application file for complete search history.

(56) References Cited

U.S. PATENT DOCUMENTS

| | | | |
|---|---|---|---|
| 4,064,413 A | 12/1977 | Andersen | |
| 4,770,644 A * | 9/1988 | Feder | B60D 1/64 439/166 |
| 5,993,262 A | 11/1999 | Kowdynski et al. | |
| 6,120,052 A * | 9/2000 | Capik | B60D 1/36 280/477 |
| 7,118,379 B1 * | 10/2006 | Wang | H01R 13/6641 439/35 |
| 7,746,219 B1 * | 6/2010 | Paul | B60D 1/01 340/431 |
| 2001/0050471 A1 * | 12/2001 | McCoy | B60D 1/485 280/504 |
| 2005/0037632 A1 * | 2/2005 | Ihde | B60D 1/62 439/35 |
| 2006/0254806 A1 * | 11/2006 | White | B60D 1/62 174/135 |
| 2007/0046454 A1 * | 3/2007 | Bienvenue | B60Q 1/305 340/463 |
| 2008/0113522 A1 * | 5/2008 | Wagner | H01R 13/5213 439/35 |
| 2008/0272699 A1 * | 11/2008 | Capenos | B60Q 1/0088 315/77 |
| 2013/0063026 A1 * | 3/2013 | Stickley | B60Q 1/26 315/77 |
| 2013/0221981 A1 * | 8/2013 | Miller | G01R 31/043 324/538 |
| 2013/0264863 A1 * | 10/2013 | McCollum | B60Q 11/00 307/9.1 |

FOREIGN PATENT DOCUMENTS

WO   02/22395 A2   3/2002

OTHER PUBLICATIONS

"RV Glow—Turn Your Outside Camper Lights Into Patio Lights", retrieved from www.rvglow.com, Sep. 19, 2013, 6 pages.
"Trailer Wiring Diagrams", retrieved from www.etrailer.com/faq-wiring.aspx, Aug. 7, 2013, 6 pages.

* cited by examiner

*Primary Examiner* — Brandon S Cole
(74) *Attorney, Agent, or Firm* — Brake Hughes Bellermann LLP (57) ABSTRACT

The embodiments may include a connector device configured to be coupled to a cord-end connector of a connection cord of a first vehicle designed to be connected to a second vehicle capable of towing the first vehicle. The connector device is configured to provide access to a power source included within the first vehicle. In some examples, the connector device is configured to receive electrical power from the power source and re-route the electrical power back to the first vehicle for activating one or more components on the first vehicle. In some examples, the connector device may be configured to be coupled to at least one external device. The connector device may be configured to power or charge the at least one external device based on the provided access.

17 Claims, 9 Drawing Sheets

CONNECTOR DEVICE FOR PROVIDING ACCESS TO ELECTRICAL POWER

BACKGROUND

Conventionally, a towed vehicle may be connected to a towing vehicle in order to operate the various driving lights or signals on the towed vehicle such as the brake lights, the tail and license lights, the turn signals, and various external lighting. In some known examples, a trailer connection cord may extend from the towed vehicle and connect to the towing vehicle via a pair of connectors in order to provide the driver of the towing vehicle the capabilities of operating the various driving lights/signals on the towed vehicle. In addition, when coupled to the towed vehicle, the towing vehicle may power or charge a battery located on the towed vehicle via the trailer connection cord.

However, conventional mechanisms do not allow someone to operate some of the components on the towed vehicle (e.g., the external lighting) when the trailer connection cord is not connected to the towed vehicle. In one example, the towed vehicle may be a camper trailer that is towed by an automobile. However, when the camper trailer is located at a campsite, the camper trailer is not necessarily connected to the towing vehicle and, therefore, is prevented from illuminating the external lighting on the camper trailer.

In addition, individuals such as campers may find themselves in a situation where an electrical power source is not available. For example, typically, when a camper trailer is located at a campsite, the campsite provides an electrical outlet where a power cord of the camper trailer can be connected. This electrical power source may provide electrical power to the electrical panel of the camper trailer, which activates the power outlets and other components on the camper trailer. However, if the camper trailer is not connected to an electrical power source, the electrical power on the camper trailer is limited to a small subset of components by using energy supplied from its battery. However, a camper may find themselves in a position which he/she requires a power source such as a 12-volt power source in order to power or charge an external device.

SUMMARY

The embodiments include a connector device configured to be coupled to a cord-end connector of a connection cord of a first vehicle designed to be connected to a second vehicle capable of towing the first vehicle. The connector device is configured to provide access to a power source included within the first vehicle.

In some examples, the connector device is configured to receive electrical power from the power source and re-route the electrical power back to the first vehicle for activating one or more components on the first vehicle. The one or more components may include one or more external lights located on the outside of the first vehicle. The power source may include a 12-volt battery.

In some examples, the connector device is configured to be coupled to at least one external device. The connector device may be configured to power or charge the at least one external device based on the provided access. The connector device may include an interface connection unit configured to be coupled to the external device, where the connector device is configured to power or charge the at least one external device via the interface connection unit.

The connector device may include a housing having a plurality of connectors configured to be coupled with connectors of the cord-end connector of the connection cord. The plurality of connectors may include a first connector associated with the power source and a second connector associated with a component on the first vehicle. The connector device may include a switching unit configured to be connected to the first connector and the second connector and configured to provide a connection between the first connector and the second connector.

The housing may be configured to permit the plurality of connectors to be coupled with the connectors of the cord-end connector when the housing is orientated in a certain position with respect to a housing of the cord-end connector.

The embodiments may include a connector device configured to be coupled to a cord-end connector of a connection cord of a first vehicle designed to be connected to a second vehicle capable of towing the first vehicle. The connector device may be configured to receive electrical power from a power source included within the first vehicle and re-route the electrical power back to the first vehicle to activate external lighting on the first vehicle. The power source may include a 12-volt battery.

The connector device may include a housing having a plurality of connectors configured to be coupled with connectors of the cord-end connector of the connection cord, where the plurality of connectors may include a first connector associated with the power source and a second connector associated with the external lighting. The connector device may include a switching unit configured to be connected to the first connector and the second connector and configured to provide a connection between the first connector and the second connector in order to re-route the electrical power to the external lighting. The switching unit may include a rocker switch.

The housing may include a base portion having a lumen extending from a first opening to a second opening. The lumen may include an arrangement of the plurality of connectors, where the switching unit is partly disposed outside the base portion via the first opening, and the second opening is configured to receive the connectors of the cord-end connector.

The housing may be configured to permit the plurality of connectors to be coupled with the connectors of the cord-end connector when the housing is orientated in a certain position with respect to a housing of the cord-end connector. The connector device may include a first terminal extender connected to the switching unit and a portion of the first connector, and a second terminal extender connected to the switching unit and a portion of the second connector.

The embodiments may include a method for providing access to power included within a vehicle. The method may include coupling a connector device to a cord-end connector of a connection cord of a first vehicle designed to be connected to a second vehicle capable of towing the first vehicle, and providing access to a power source included within the first vehicle.

The providing access to a power source included within the first vehicle may include receiving electrical power from the power source and re-routing the electrical power back to the first vehicle for activating one or more components on the first vehicle. The one or more components may include external lighting associated with the first vehicle.

The providing access to a power source included within the first vehicle may include powering at least one external device based on the power source when the at least one external device is coupled to the connector device.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of layers, regions and/or structural elements may be reduced or exaggerated for clarity. The use of similar or identical reference numbers in the various drawings is intended to indicate the presence of a similar or identical element or feature.

DETAILED DESCRIPTION

The embodiments provide a connector device that is configured to be coupled to a connection cord of a first vehicle (e.g., a towed vehicle), and the connector device is configured to provide access to a power source (e.g., battery) included within the first vehicle. The connection cord may extend from the outside of the first vehicle and be designed to connect to a second vehicle (e.g., towing vehicle) for purposes of operating the driving signals (e.g., brake light, tail light, etc.) on the first vehicle.

In one example, when the connector device is coupled to the connection cord, the connector device may re-route electrical power back to the first vehicle in order to activate one or more components on the first vehicle such as the exterior lighting that is originally designed to be illuminated at nighttime when the first vehicle is being towed on a roadway. The connector device may allow someone to activate (e.g., turn off and on) these external lights without the connection cord being connected to the second vehicle.

In another example, the connector device may provide access to the internal battery source on the first vehicle for charging or powering an external device such as a phone, smartphone, computer, laptop, tablet, or generally any type of computing device requiring electrical power. For example, the connector device may be coupled to the connection cord of the first vehicle, and the external device may be coupled to the connector device. In this manner, the connector device may be configured to charge or power the external device by tapping into the power source of the first vehicle. As such, even if an electrical hook up is not available to the first vehicle, the connector device may provide access to a power source (e.g., 12-volt power source) that otherwise is not available for such use.

In addition, the connector device may include a housing that is adaptable to a cord-end connector of the connection cord in a manner that ensures the connector device is properly coupled to the cord-end connector. For example, the cord-end connector may include an arrangement of various connectors (e.g., male or female electrical terminals) such as a connector for the brake light, a connector for the tail and license lights, a connector for the battery charge, and connectors for the left/right turn/stop signals, etc. As indicated above, conventionally, the cord-end connector is coupled to a vehicle-end connector of the second vehicle (e.g., the towing vehicle) for purposes of towing the first vehicle on the road.

However, instead of connecting the cord-end connector of the connection cord to the vehicle-end connector of the second vehicle, the connector device is coupled to the cord-end connector of the connection cord in a manner that ensures the connectors of the cord-end connector are properly aligned with one or more connectors of the connector device in order to provide access to the power supply on the first vehicle without a person having any kind of knowledge of the connector arrangement of either the cord-end connector or the connector device. In addition, the connector device may include a switching unit that is designed to activate the access to the power source on the first vehicle in order to re-route electrical power to the component(s) on the first vehicle itself and/or power or charge an external device connected to the connector device. These and other features are further explained with reference to the figures.

Figure 1A:
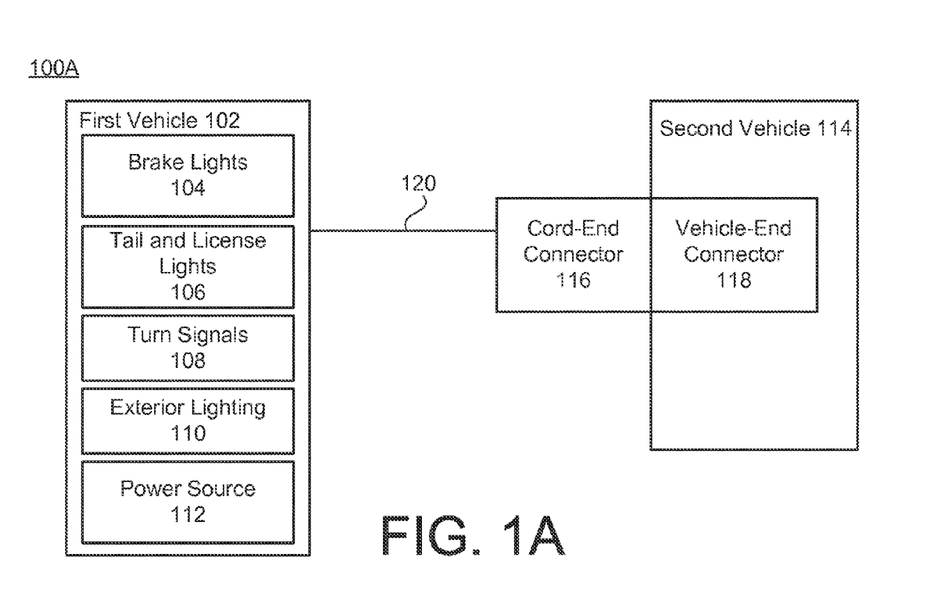
FIG. 1A illustrates a system having a first vehicle that is connected to a second vehicle via a connection cord for towing the first vehicle on a roadway.

FIG. 1A illustrates a system 100A having a first vehicle 102 that is connected to a second vehicle 114 via a connection cord 120 for towing the first vehicle 102 on a roadway. The first vehicle 102 may be any type of vehicle capable of being towed that also includes a power source 112. Throughout the disclosure, the first vehicle 102 may be sometimes referred to as a towed vehicle. In some examples, the first vehicle 102 may be a camper, camper trailer, recreational vehicle, trailer, popup camper, or camper shell. In some examples, the first vehicle 102 may be a vehicle that is not capable of being independently driven on the roadway. For example, the first vehicle 102 may not be a self-powered vehicle capable of driving on the roadway unassisted.

The second vehicle 114 may be any type of vehicle capable of towing the first vehicle 102. Throughout the disclosure, the second vehicle 114 may be sometimes referred to as a towing vehicle. In some examples, the second vehicle 114 may be an automobile, jeep, truck, tractor-trailer, recreational vehicle, or generally any type of vehicle capable of independently driving on the roadway, e.g., an automobile.

As shown in FIG. 1A, in order to tow the first vehicle 102 on the roadway, the first vehicle 102 may be connected to the second vehicle 114 via the connection cord 120. The connection cord 120 may connect the first vehicle 102 and the second vehicle 114 for purposes of operating the required driving signals/lights of the first vehicle 102 on the roadway. For example, the first vehicle 102 may include brake lights 104, tail and license lights 106, turn signals 108, and/or external lighting 110. The first vehicle 102 may include other types of lighting/signals that may be required or beneficial for being towed on the roadway.

The first vehicle 102 may also include a power source 112 that is capable of being charged when connected to the second vehicle 114 via the connection cord 120. The power source 112 may be any type of power source located on the first vehicle 102. In one example, the power source 112 may be a battery for supplying power to one or more components of the first vehicle 102 when the first vehicle 102 is not connected to an external power hook-up or connected to the second vehicle 114. In one specific example, the power source 112 may provide electrical power to lights included within the first vehicle 102. In one example, the power source 112 may be a battery providing a 12-volt power source.

By coupling the connection cord 120 to the second vehicle 114, a driver of the second vehicle 114 may operate the various driving signals/lights included on the first vehicle 102 (e.g., the brake lights 104, the tail and license lights 106, the turn signals 108, the external lighting 110, etc.), as well as charge the power source 112 of the first vehicle 102. Also, the first vehicle 102 may be secured to the second vehicle 114 via any type of known towing mechanisms that permit the first vehicle 102 to be securely connected to the second vehicle 114 when driving on the roadway.

The connection cord 120 may include a cord-end connector 116 that is designed to be coupled to a vehicle-end connector 118 located on the second vehicle 114. For example, the connection cord 120 may extend from the first vehicle 102, and the cord-end connector 116 may be disposed on an end of the connection cord 120. As such, a person may couple the cord-end connector 116 to the vehicle-end connector 118 of the second vehicle 114. The cord-end connector 116 may include a plurality of connectors (e.g., connectors 362 shown in FIG. 3F) that are arranged in a manner to be coupled to corresponding connectors of the vehicle-end connector 118 in order to allow for the correct signals to be supplied to the correct driving components of the first vehicle 102 as well as the charging of the power source 112. Accordingly, the connection cord 120 may include a plurality of internal wires (e.g., internal wires 119 shown in FIG. 1B) that extend to the appropriate components on the first vehicle 102 or an intermediate component (e.g., an electrical relay, electrical panel) on the first vehicle 102, which then supplies the signals to the appropriate components. The other ends of the internal wires 119 are extended to the connectors of the cord-end connector 116.

Figure 1B:
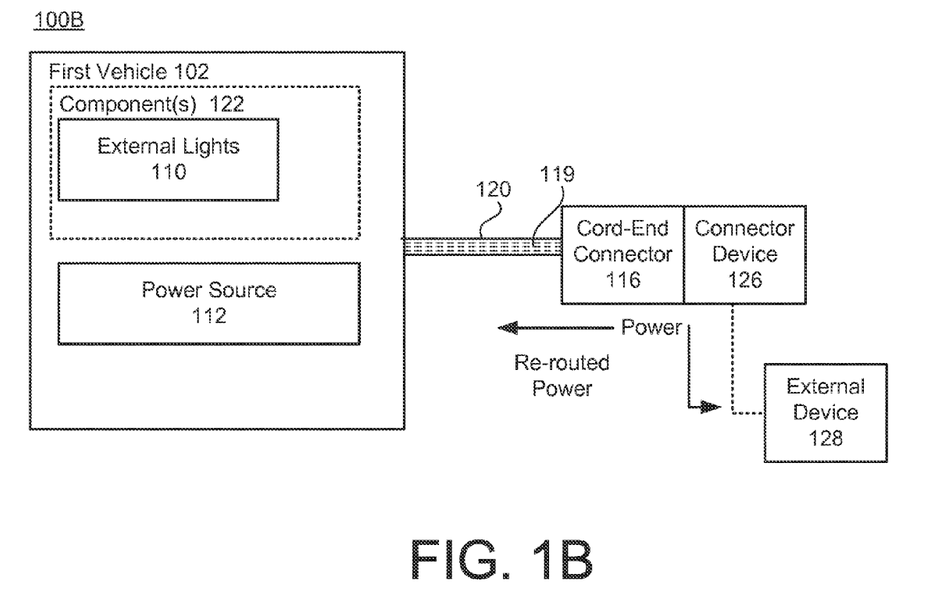
FIG. 1B illustrates a system depicting the connection cord being coupled to a connector device according to the embodiment.

FIG. 1B illustrates a system 100B depicting the cord-end connector 116 of the connection cord 120 being coupled to a connector device 126, according to an embodiment. For example, the connector device 126 may be configured to be coupled to the cord-end connector 116 of the connection cord 120 of the first vehicle 102, and the connector device 126 may be configured to provide access to the power source 112 included on the first vehicle 102. As indicated above, the connection cord 120 may be designed to be connected to the second vehicle 114 for purposes of towing the first vehicle 102. However, instead of coupling the connection cord 120 to the vehicle-end connector 118 of the second vehicle 114, the connector device 126 may be coupled to the cord-end connector 116 of the connection cord 120. The connector device 126 may be configured to allow access to the power source 112 on the first vehicle 102 that is otherwise not accessible in most situations.

In one embodiment, the connector device 126 may be configured to re-route electrical power from the power source 112 to the first vehicle 102 for activating one or more components 122 on the first vehicle 102. The one or more components 122 may include the external lighting 110. For example, the external lighting 110 may be one or more lights located on an outside of the first vehicle 102. Conventionally, a driver of the second vehicle 114 may activate the external lighting 110 (or may be automatically activated) when driving during the night or dusk so that other drivers may easily see the first vehicle 102 that is towed by the second vehicle 114. However, when the connection cord 120 is not connected to the second vehicle 114, a person has virtually no way of illuminating the external lighting 110. According to one embodiment, after the connector device 126 is coupled to the cord-end connector 116 of the connection cord 120, the external lighting 110 may be activated by operating the connector device 126 (e.g., flipping a switch), which then re-routes the electrical power back to the first vehicle 102 via the connection cord 120 such that the external lighting 110 is illuminated.

As indicated above, the connection cord 120 may extend from the first vehicle 102, and the cord-end connector 116 may be located on the end of the connection cord 120. The cord-end connector 116 may include connectors that are directly or indirectly connected to one or more internal wires 119 that extend along at least the length of the connection cord 120. One or more of these internal wires 119 may be associated with the power source 112. As such, the internal wire 119 associated with the power source 112 may extend further into the first vehicle 102 and may be connected to the power source 112. Alternatively, the internal wire 119 associated with the power source 112 may be connected to one or more intermediate components (e.g., an electrical panel, or other type of electrical relay) which then provides a connection to the power source 112. As such, the connection cord 120 includes at least one internal wire 119 that directly or indirectly provides a connection to the power source 112.

Typically, this power source connection is used for charging the power source 112 by the second vehicle 114 when the connection cord 120 is coupled to the second vehicle 114. For example, this power source connection is not originally designed to supply electrical power, but rather to receive it from the second vehicle 114 for purposes of charging the power source 112. As such, the power source 112 is originally designed to be a power source within the actual first vehicle 102—not supplying electrical power via the connection cord 120.

However, the connector device 126 may be coupled to the cord-end connector 116 of the connection cord 120 in a manner that connects the internal wire 119 corresponding to the power source 112 to another internal wire 119, or more generally, provides access to the internal wire 119 corresponding to the power source 112. Because this connection to the power source 112 is active (e.g., the internal wire 119 is an active line at all times or most times), when coupled, the connector device 126 may actually receive electrical power from the power source 112 via the connection cord 120. Then, the connector device 126 may be configured to re-route the electrical power received from the connector associated with the internal wire 119 corresponding to the power source 112 back to the first vehicle 102 along a different internal wire 119 of the connection cord 120 that may be at least indirectly connected to the external lights 110, for example.

In this context, the connector device 126 may provide one or more bridges (or connection points) between the connector of the cord-end connector 116 that is associated with the power source 112 and the connector(s) of the cord-end connector 116 that is associated with one or more components 122 such as the external lights 110. As further explained with reference to FIG. 2, the bridges or connections points associated with the connector device 126 may be connectors and/or switches. Therefore, the connector device 126 may be configured to receive electrical power from the power source 112 via the connection cord 120, and then re-route the electrical power back to the first vehicle 102 for activating the one or more components 122 on the first vehicle 102.

According to another embodiment, the connector device 126 may be configured to be coupled to at least one external device 128. The external device 128 may include a phone, smartphone, computer, laptop, tablet, or generally any type of device requiring electrical power. For example, the connector device 126 may be configured to be directly or indirectly coupled to the external device 128 via a standard power cord associated with the external device 128, for example. The connector device 126 may be configured to power or charge the external device 128 based on the provided access when coupled to the external device 128 and the cord-end connector 116 of the connection cord 120. For example, the connector device 126 may provide one or more bridges (or connection(s)) between the internal wire 119 or connector of the cord-end connector 116 that is associated with the power source 112 and a connector interface unit, disposed on the connector device 126, that is configured to connected to the external device 128. These features are further explained with reference to FIG. 2.

Figure 2:
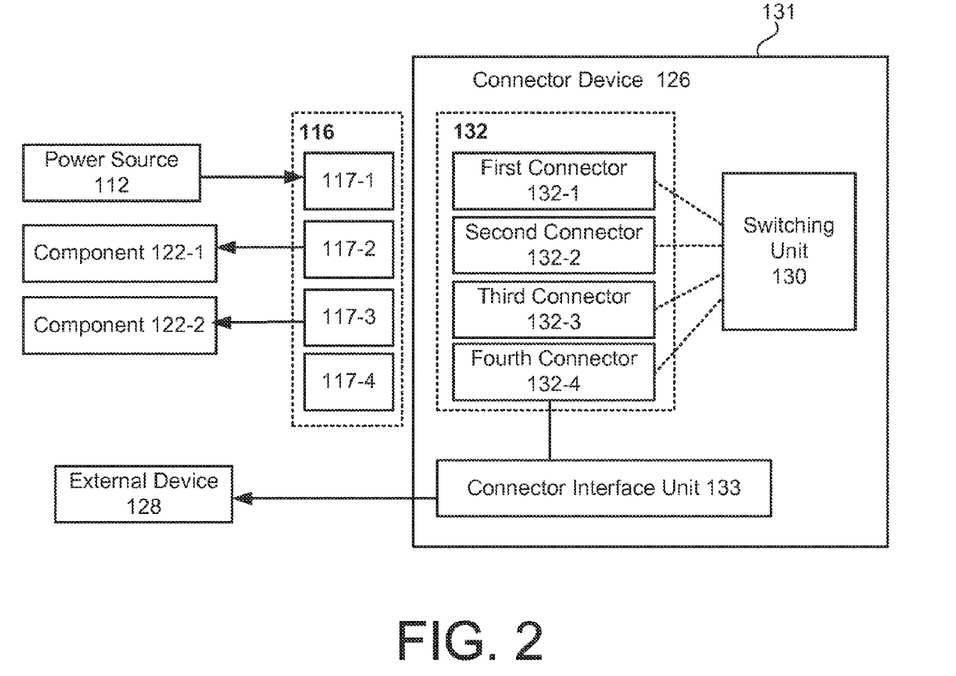
FIG. 2 illustrates a connector device according to an embodiment.

FIG. 2 illustrates the connector device 126 according to an embodiment. The connector device 126 may include a housing 131, a plurality of connectors 132, a switching unit 130, and at least one connector interface unit 133. The housing 131 may be configured to enclose the plurality of connectors 132 and may be configured to at least partially enclose the switching unit 130. The housing 131 may have a shape that is designed to correspond to a housing associated with the cord-end connector 116 to ensure that one or more connectors 132 of the connector device 126 properly align with connectors 117 of the cord-end connector 116. In one example, the housing 131 may be designed to be coupled with the housing of the cord-end connector 116 such that the fit between these two housing may occur when the housing 131 is orientated in a specific way with respect to the housing of the cord-end connector 116.

The plurality of connectors 132 may include a first connector 132-1, a second connector 132-2, a third connector 132-3, and a fourth connector 132-4. The connectors 132 are configured to be coupled to the connectors 117 of the cord-end connector 116. However, it is understood that the number of connectors 132 illustrated in FIG. 2 is merely an example for explanatory purposes, where the embodiments may encompass any number of connectors 132 such as any integer greater or equal to two. In some examples, the number of connectors 132 may match the number of connectors 117 on the cord-end connector 116 of the connection cord 120. For example, if the cord-end connector 116 of the connection cord 120 is a 7-way connector, the connectors 132 may include seven connectors 132 to match the cord-end connector 116. In this example, the cord-end connector 116 includes a first connector 117-1, a second connector 117-2, a third connector 117-3, and a fourth connector 117-4, each of which corresponds to a specific connector 132 of the connector device 126. In other examples, the number of connectors 132 does not necessarily have to match the number of connectors 117 on the cord-end connector 116. For example, the number of connectors 132 may be greater than or less than the number of connectors 117 on the cord-end connector 116.

In some examples, the connectors 132 may be male connectors having electrical terminals that are configured to be received by female connectors 117 of the cord-end connector 116. In other examples, the connectors 132 may be female connectors having recesses with electrical terminals located within the recesses in order to receive the male connectors 117 of the cord-end connector 116. In either case, the connectors 132 of the connector device 126 may be coupled to the connectors 117 of the cord-end connector 116 in manner that properly couples them together.

In one non-limiting example, the first connector 132-1 may be associated with the power source 112, the second connector 132-2 may be associated with a first component 122-1 such as the external lighting 110, the third connector 132-2 may be associated with a second component 122-2 such as the tail and license lights 106, and the fourth connector 132-4 may be associated with the external device 128. Therefore, when the connector device 126 is coupled to the connectors 117 of the cord-end connector 116 of the connection cord 120, the housing 131 of the connector device 126 is designed to ensure that the connector 117-1 of the cord-end connector 116 associated with the power source 112 connects to the first connector 132-1, the connector 117-2 of the cord-end connector 116 associated with the external lighting 110 connects to the second connector 132-1, and the connector 117-3 of the cord-end connector 116 associated with the tail and license lights 106 connects to the third connector 132-3. However, it is noted that besides the first connector 132-1 associated with the power source 112, the other connectors 132 may be associated with other types of components 122 (e.g., the brake lights 104, turn signals 108, etc.) so long as the connection cord 120 provides an internal wire 119 back to the first vehicle 102.

The connector interface unit 133 may be any type of electrical component configured to allow the external device 128 to be connected to the connector device 126. For example, the connector interface unit 133 may be adapted to connect to the external device 128 directly or via a power cord. In one example, the connector interface unit 133 may be configured to receive a power cord associated with the external device 128 via a USB or standard two-prong electrical socket. In one example, the fourth connector 132-4 may be connected to the connector interface unit 133. In another example, the fourth connector 132-4 is simply omitted. Although one connector interface unit 133 is illustrated in FIG. 2, the connector device 126 may include multiple connector interface units 133 in order to power or charge multiple external devices 128 at the same time.

The switching unit 130 may include one or more switches designed to create an open circuit and/or provide one or more connections between the first connector 132-1 associated with the power source 112 and one or more other connectors 132 (and/or the connector interface unit 133). The switching unit 130 may be connected to some or all the connectors 132. In the example of FIG. 2, the switching unit 130 may be connected to the first connector 132-1, the second connector 132-2, the third connector 132-4, and the fourth connector 132-4. Based on a user operating the switching unit 130, the switching unit 130 may be configured to connect the first connector 132-1 associated with the power source 112 to one or more other connectors 132. In addition, the switching unit 130 does not necessarily have to be connected to the fourth connector 132-4 associated with the external device 128 or include the fourth connector 132-4. Rather, the first connector 132-1 may be connected to the connector interface unit 133 without using the fourth connector 132-4 and/or the switching unit 130. In this example, a constant flow of electrical power may be provided to the connector interface unit 133.

The switching unit 130 may include any type of switching mechanism that provides a connection(s) between the first connector 132-1 associated with the power source 112 and one or more other connectors 132. Also, the switching unit 130 may provide an open circuit, e.g., no connections between the first connector 132-1 and the other connectors 132. In some examples, the switching unit 130 may be a rocker switch, a rotary switch, slide switch, and/or push button switch having 2 or more positions. In one example, the switching unit 130 may be partly exposed outside the housing 131 in order to permit a user to operate the switching unit 130. As such, if a user operates the switch from an open position to a first position, the switching unit 130 may provide a connection between the first connector 132-1 and the second connector 132-1 associated with the first component 122-1, thereby re-routing electrical power back to the first vehicle 102 in order to illuminate the external lighting 110, for example. If a user operates the switch from the first position to a second position, the switching unit 130 may provide a connection between the first connector 132-1 and the third connector 132-3 associated with the second component 122-2, thereby re-routing electrical power back to the first vehicle 102 in order to illuminate the tail and license lights 106, for example. In addition, the switching unit 130 may be moved to a third position that activates two or more components 122 associated with the first vehicle 102. However, the embodiments encompass any type of arrangement of these components to provide the desired access to the power source 112.

Figure 3A:
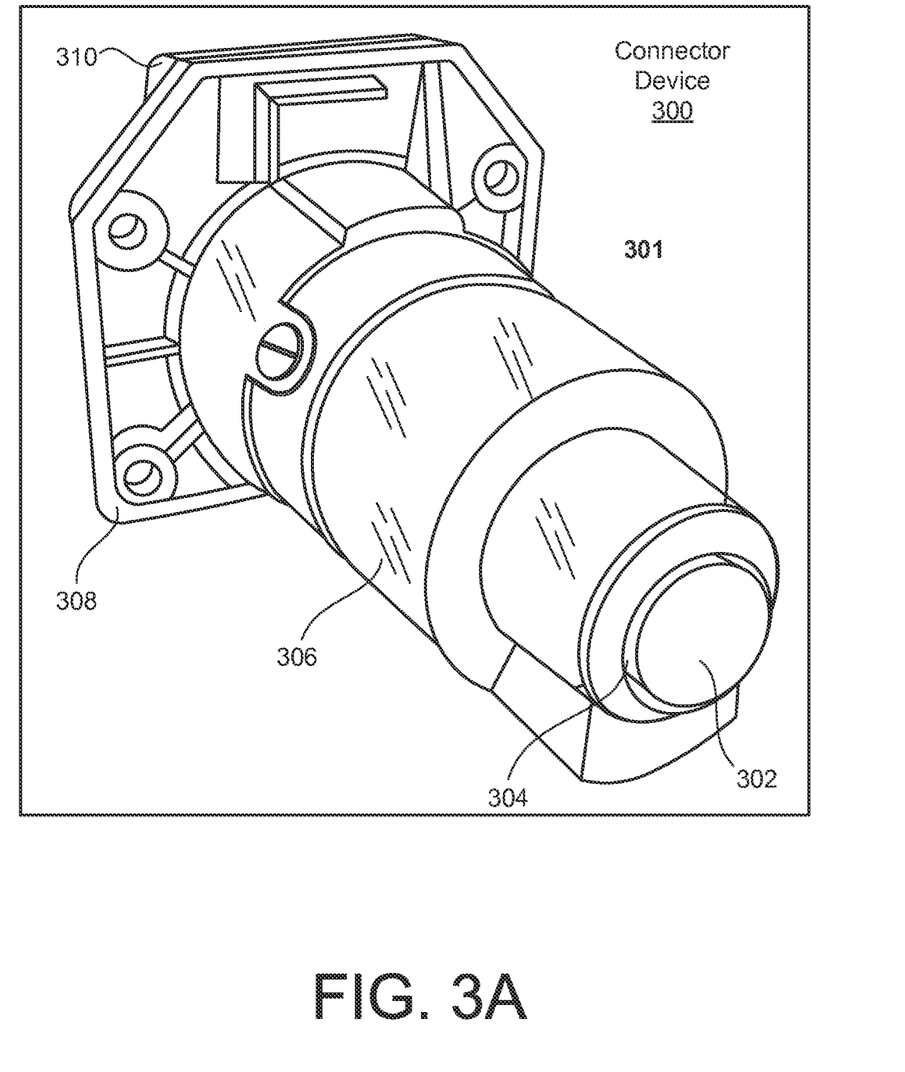
FIG. 3A illustrates a perspective of a connector device according to an embodiment.

FIGS. 3A-3E illustrate various views of a connector device 300 according to another embodiment. In some examples, the connector device 300 includes all of the features and functionalities described above with respect to the connector device 126 of FIGS. 1A and 2. FIG. 3A illustrates a perspective of the connector device 300 according to an embodiment. Similar to the connector device 126 of FIG. 1B, the connector device 300 may be configured to be coupled to the cord-end connector 116 of the connection cord 120 of the first vehicle 102, and the connector device 300 may be configured to provide access to the power source 112 included on the first vehicle 102. As indicated above, the connection cord 120 may be designed to be connected to the second vehicle 114 for purposes of towing the first vehicle 102.

However, instead of connecting the connection cord 120 to the second vehicle 114, the connector device 300 may be coupled to the cord-end connector 116 of the connection cord 120. The connector device 300 is configured to allow access to the power source 112 that is otherwise not accessible. In one example, the connector device 300 is configured to receive electrical power from the power source 112 and re-route the electrical power back to the first vehicle 102 in order to activate the external lighting 110. As indicated above, the connector device 300 may receive the electrical power via one or more internal wires 119 of the connection cord 120, and route the electrical power back to the first vehicle 102 via another internal wire 119 in order to activate the external lighting 110.

Referring to FIG. 3A, the connector device 300 may include an outer casing 301 having a base portion 306, an extension portion 308, and a lid 310 connected to a portion of the extension portion 308. The base portion 306 may enclose the internal components (e.g., internal components 330 of FIG. 3D) of the connector device 300. In one example, the base portion 306 may be generally circular or tubular in shape. Also, the base portion 306 may define a lumen (e.g., inside space of a tubular structure) extending through the length of the base portion 306, where the lumen is configured to receive the internal components of the connector device 300.

The extension portion 308 may be integrally formed with the base portion 306. The extension portion 308 may be disposed on the end of the base portion 306 that receives the cord-end connector 116 of the connection cord 120. The extension portion 308 may extend outwardly from the tubular structure of the base portion 306 in a manner that the extension portion 308 appears to be substantially square. The other end of the base portion 306 (e.g., opposite of the extension portion 308) includes an opening 304. In this context, the size of the lumen of the base portion 306 may decrease at various portions along the length of the base portion 306 starting from the extension portion 308 to the opening 304. In one example, the size of the lumen of the base portion 306 may be smallest at the location where the opening 304 is formed.

The opening 304 in the base portion 306 may be size to receive a rocker switch 302. As further explained later in the disclosure, the rocker switch 302 may be configured to provide a connection that permits the electrical power to be re-routed back to the first vehicle 102 thereby activating the external lights 110. As shown in FIG. 3A, the rocker switch 302 is partly exposed outside the base portion 306 such that a user can move the rocker switch 302 from a first position to a second position, and vice versa. In one example, when the rocker switch 302 is in the first position, the rocker switch 302 provides the connection between two connectors (e.g., one is associated with the power source 112 and the other one is associated with the external lighting 110) that permits the electrical power to be re-routed back to the first vehicle 102 to activate the external lighting 110. When the rocker switch 302 is in the second position, the rocker switch 302 does not provide a connection between these connectors (e.g., creating an open circuit), thereby de-activating the external lighting 110.

Figure 3B:
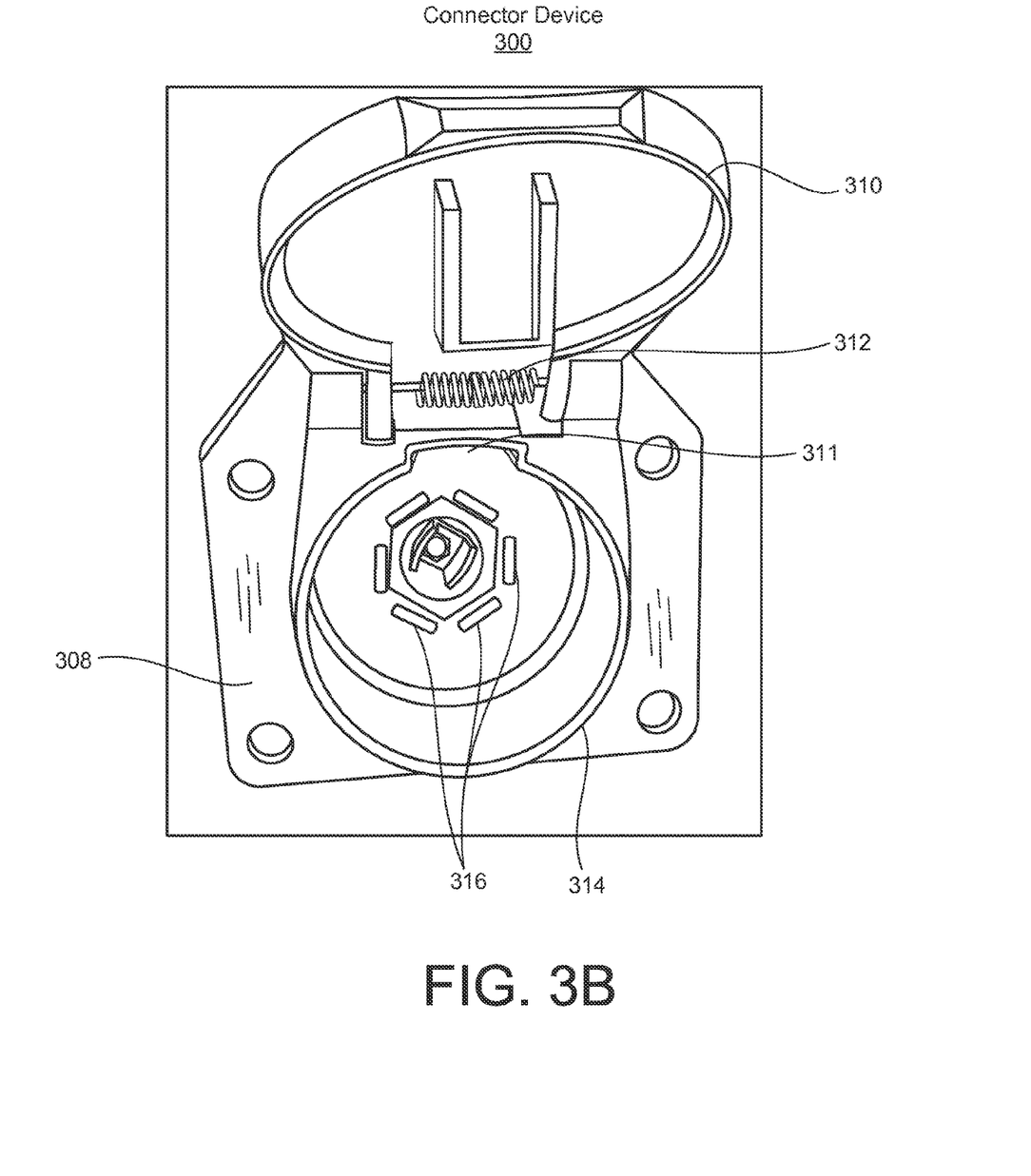
FIG. 3B illustrates a front view of the connector device according to an embodiment.

FIG. 3B illustrates a front view of the connector device 300 according to an embodiment. As shown in FIG. 3B, the lid 310 may open and close in order to permit the cord-end connector 116 of the connection cord 120 to be inserted into the connector device 300. The lid 310 may be connected to the extension portion 308 via a spring hinge 312 that is biased to the closed position. The connector device 300 may define an opening 314 to the lumen that extends to the opening 304 shown in FIG. 3A. As shown in FIG. 3B, a plurality of connectors 316 be disposed within the lumen of the base portion 306. For example, the plurality of connectors 316 may be disposed in a location within the lumen that is recessed from the opening 314. The connectors 316 may be similar to the connectors 132 described with reference to FIG. 2.

Also, the base portion 306 of the connector device 300 may define a recess 311 proximate to the opening 314. The recess 311 may permit the proper orientation when the cord-end connector 116 of the connection cord 120 is coupled to the connector device 300. For example, the recess 311 has a structure that relates to a structure on the cord-end connector 116 that allows the cord-end connector 116 to be inserted into the opening 314 in only one orientation in order to ensure that the connectors 316 connect with the corresponding connectors of the cord-end connector 116.

Figure 3C:
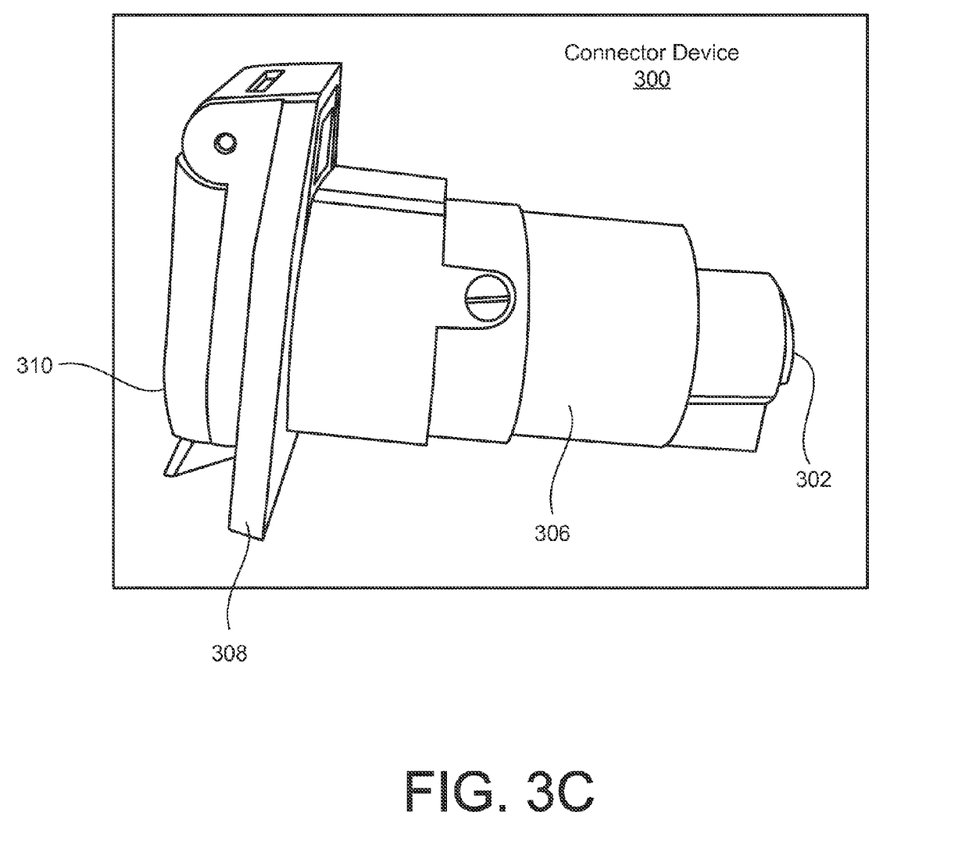
FIG. 3C illustrates a side view of the connector device according to an embodiment.

FIG. 3C illustrates a side view of the connector device 300 according to an embodiment. For example, as described above, the connector device 300 includes the base portion 306 having a generally tubular shape. One end of the base portion 306 includes the extension portion 308 that is connected to the movable lid 310, and the other end of the base portion 306 includes the rocker switch 302 that is partly exposed outside the base portion 306.

Figure 3D:
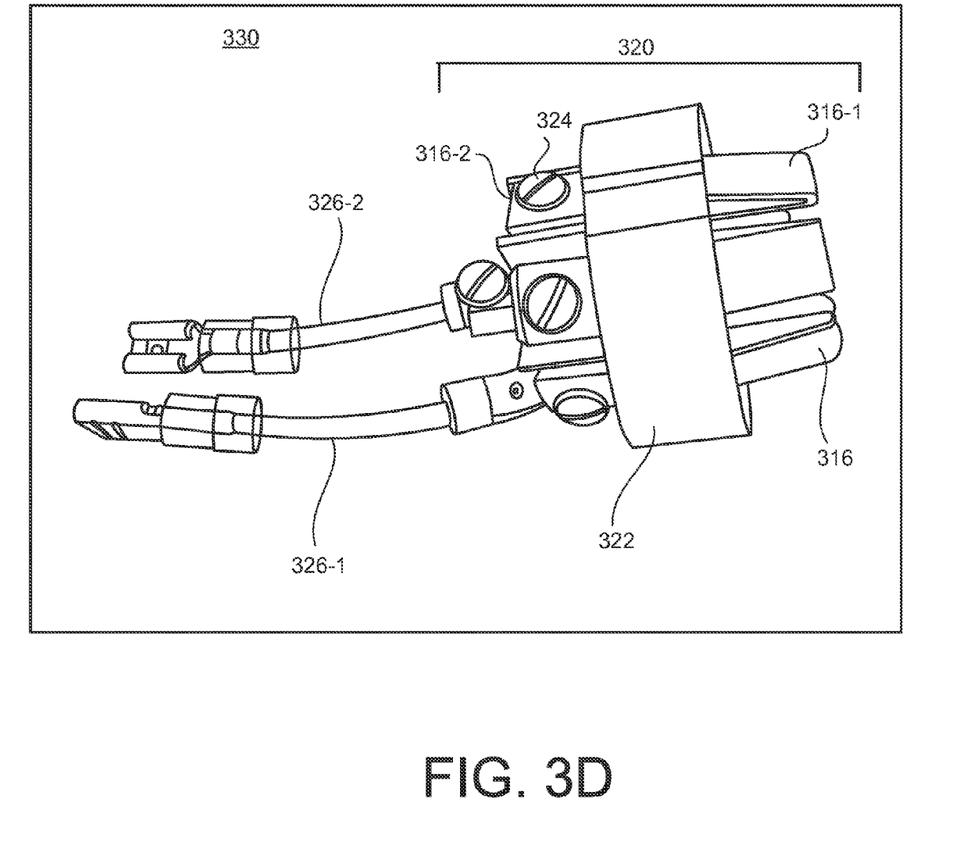
FIG. 3D illustrates internal components of the connector device according to an embodiment.

FIG. 3D illustrates internal components 330 of the connector device 300 according to an embodiment. The internal components 330 may include a connector unit 320 and a plurality of terminal extenders 326. The connector unit 320 may include a connector housing 322, and the plurality of connectors 316. The connector housing 322 may be adapted to secure the plurality of connectors 316 in an arrangement such as a circular arrangement. Each connector 316 may have a first portion 316-1 that extends on one side of the connector housing 322 and a second portion 316-2 that extends on the other side of the connector housing 322. The first portion 316-1 of each connector 316 may be configured to be connected to a corresponding connector on the cord-end connector 116. The second portion 316-2 of one or more connectors 316 may be connected to the terminal extender 326. In one example, a fastener 324 (e.g., screw) may be inserted into the second portion 316-2 to secure the terminal extender 326 to the second portion 316-2.

In one example, the terminal extenders 326 may include a first terminal extender 326-1 and a second terminal extender 326-2. The first terminal extender 326-1 may be connected to the second portion 316-2 of a connector 316 corresponding to the power source 112. The second terminal extender 326-2 may be connected to the second portion 316-2 of a connector 316 corresponding to the external lighting 110. The first terminal extender 326-1 and the second terminal extender 326-2 may be connected to the rocker switch 302 shown in FIG. 3A. As such, when the rocker switch 302 is switched to one of the two positions, the rocker switch 302 may complete the connection from the connector 316 corresponding to the power source 112 and the connector 316 corresponding to the external lighting 110 via the first terminal extender 326-1 and the second terminal extender 326-2 via the second terminal extender 326-2. Therefore, the connector device 300 may re-route the electrical power back to the first vehicle 102 to illuminate the external lighting 110.

Figure 3E:
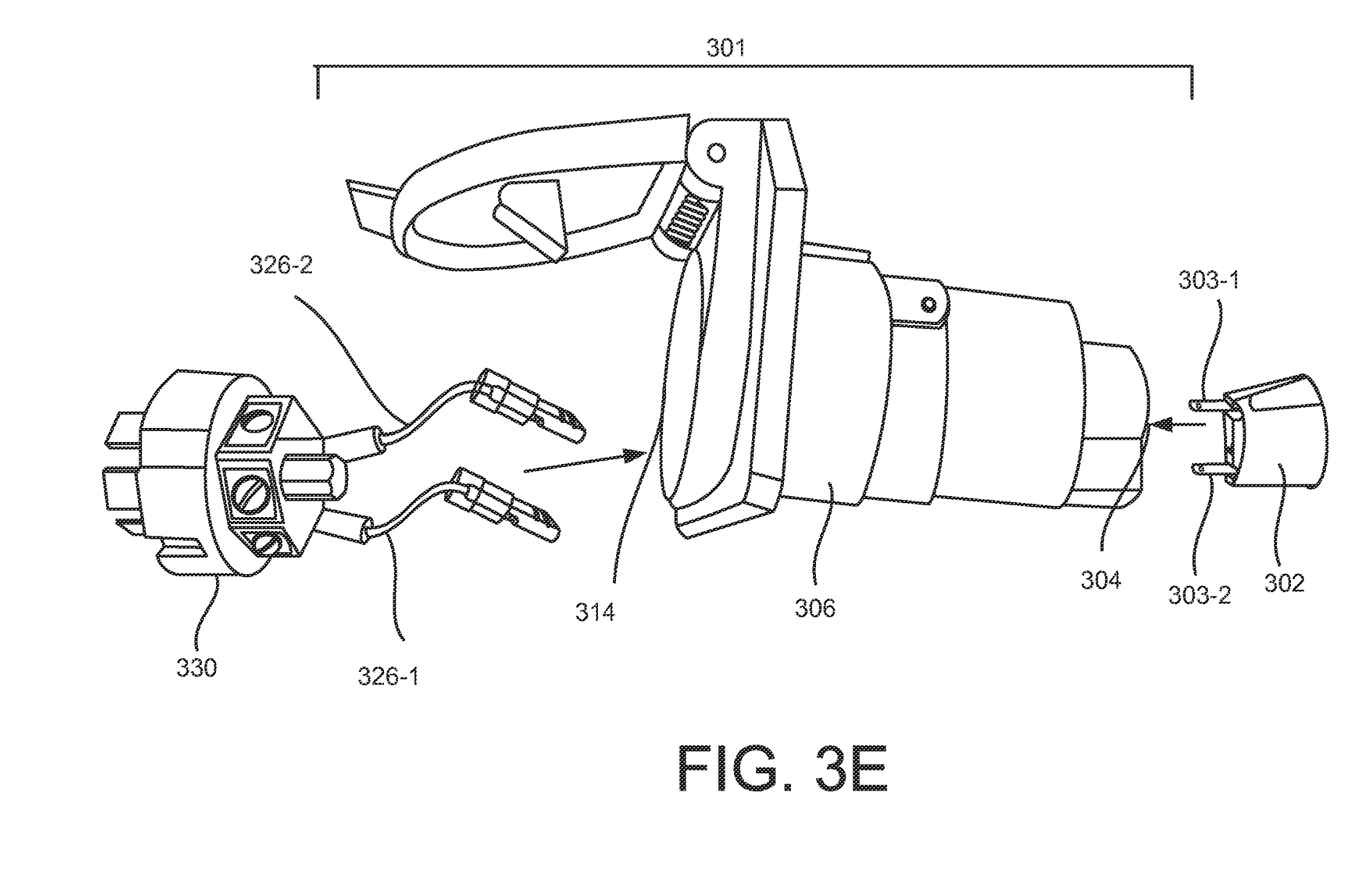
FIG. 3E illustrates an unassembled connector device according to an embodiment.

FIG. 3E illustrates the unassembled connector device 300 having the internal components 330, the outer casing 301, and the rocker switch 302 according to an embodiment. For example, the internal components 330 may be inserted into the opening 314 of the base portion 306 such that the internal components 330 fit within the lumen of the base portion 306. The rocker switch 302 may be inserted into the opening 304 of the base portion 306. The first terminal extender 326-1 may be connected to a first prong 303-1 of the rocker switch 302, and the second terminal extender 326-2 may be connected to a second prong 303-2 of the rocker switch 302. The internal components 330 may be secured within the lumen of the base portion 306 based on an interference fit or secured with any type of fastener(s). Also, the rocker switch 302 may be secured within the lumen of the base portion 306 based on an interference fit or secured with any type of fastener(s).

Figure 3F:
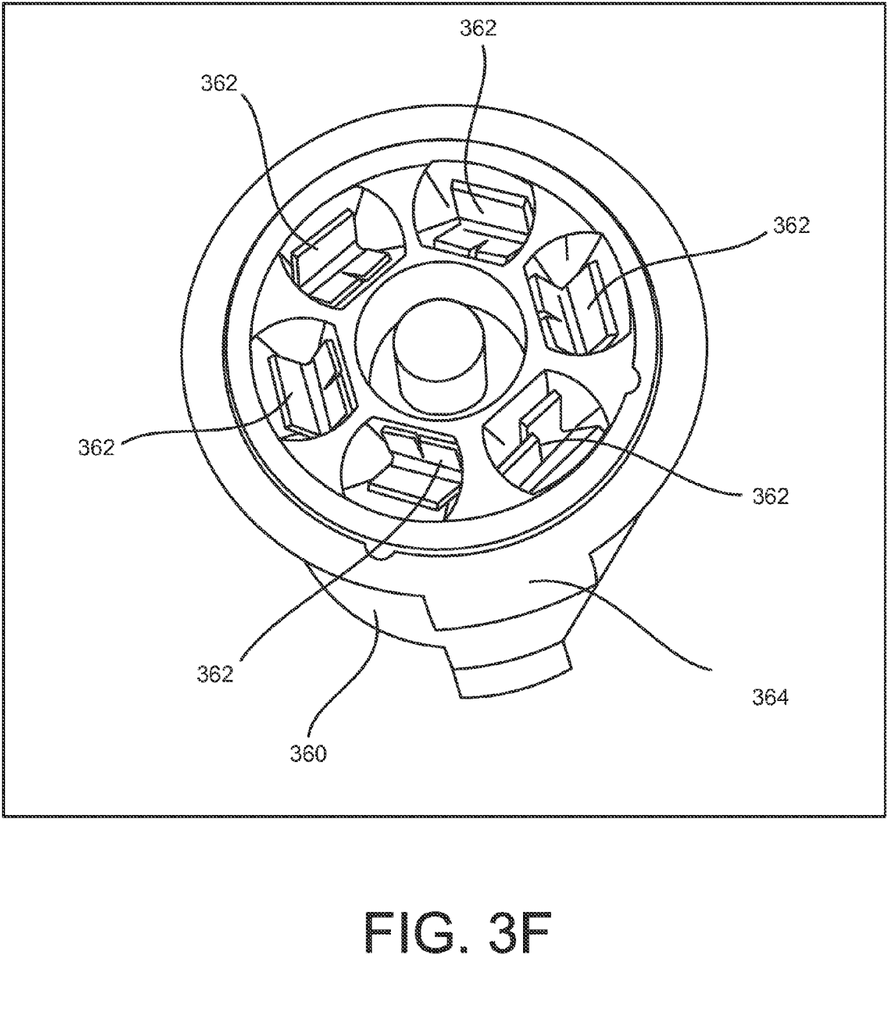
FIG. 3F illustrates an example of a cord-end connector of the connection cord according to an embodiment.

FIG. 3F illustrates an example of a cord-end connector 360 of the connection cord 120 according to an embodiment. In some examples, the cord-end connector 360 is the cord-end connector 116 as previously described. The cord-end connector 360 may include a plurality of connectors 362 that are arranged in a circular fashion and in the same arrangement as the connectors 316 of the connector device 300. In this example, the connectors 362 may be female connectors designed to receive the connectors 316 of the connector device 300. Further, the cord-end connector 360 may include a protrusion 364 having a size that can fit within the recess 311 of the connector device 300. The fitting of the protrusion 364 of the cord-end connector 360 within the recess 311 of the connector device 300 allows the connectors 362 to align with the corresponding connectors 316 of the connector device 300.

Figure 4:
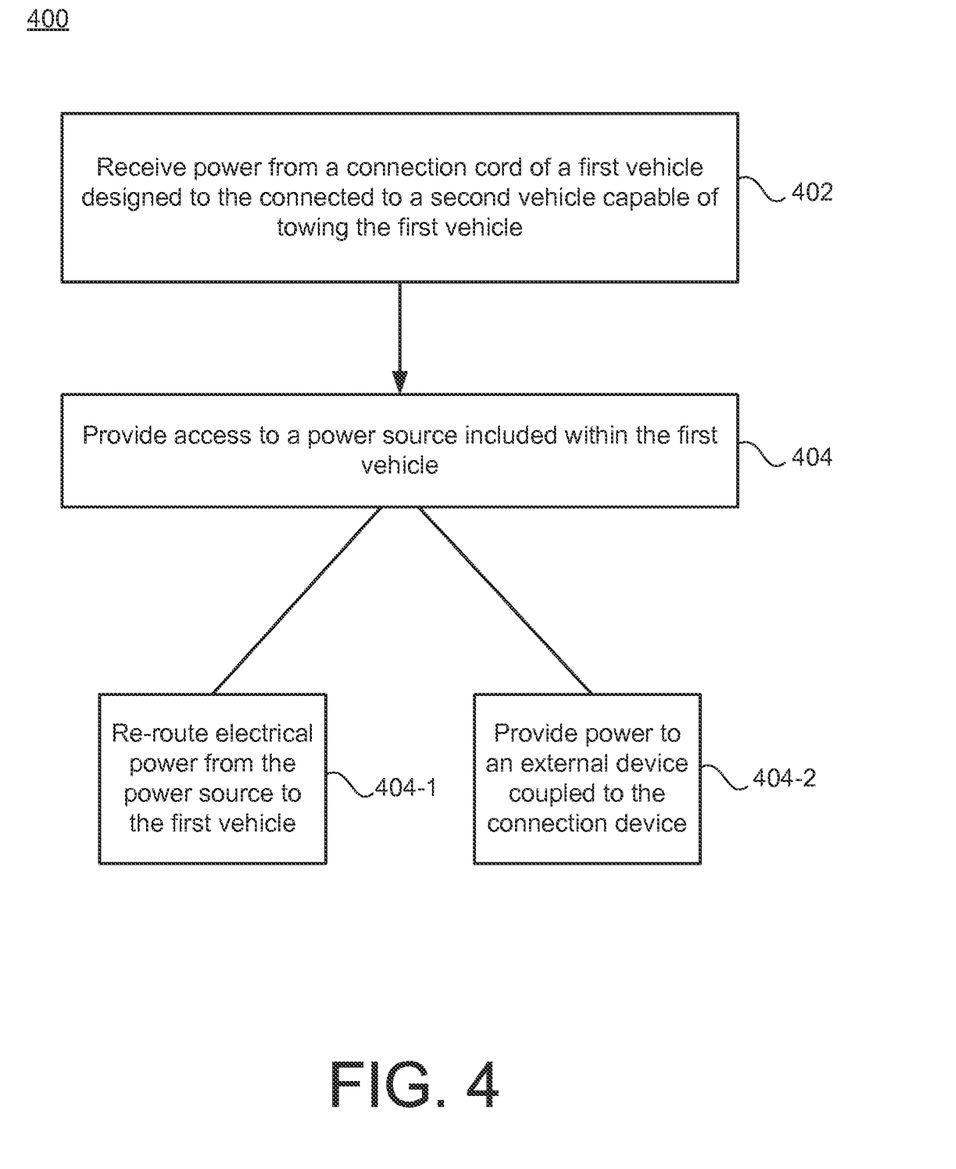
FIG. 4 illustrates example operations of the connector device of the figures according to an embodiment.

FIG. 4 illustrates example operations of the connector device 126/300 according to an embodiment. Although FIG. 4 is illustrated as a sequential, ordered listing of operations, it will be appreciated that some or all of the operations may occur in a different order, or in parallel, or iteratively, or may overlap in time.

Power from a connection cord of a first vehicle designed to be coupled to a second vehicle capable of towing the first vehicle may be received (402). For example, the connector device 126/300 may be coupled to the cord-end connector 116/360 of the connection cord 120. The connection cord 120 may be designed to be coupled to the vehicle-end connector 118 of the second vehicle 114 for purposes of towing the first vehicle 102. However, instead of coupling the cord-end connector 116/360 of the connection cord 120 to the vehicle-end connector 118 of the second vehicle 114, the connector device 126 may be coupled to the cord-end connector 116/360 of the connection cord 120.

The connection cord 120 may extend from the first vehicle 102, and the cord-end connector 116/360 may be located on the end of the connection cord 120. The cord-end connector 116/360 may include connectors (e.g. connectors 117/362) that are directly or indirectly connected to one or more internal wires 119 that extend along at least the length of the connection cord 120. One or more of these internal wires 119 may be associated with the power source 112. As such, the internal wire 119 associated with the power source 112 may extend further into the first vehicle 102 and may be connected to the power source 112. Alternatively, the internal wire 119 associated with the power source 112 may be connected to one or more intermediate components (e.g., an electrical panel, or other type of electrical relay) which then provides a connection to the power source 112. As such, the connection cord 120 includes at least one internal wire 119 that directly or indirectly provides a connection to the power source 112.

Typically, this power source connection is used for charging the power source 112 by the second vehicle 114 when the connection cord 120 is coupled to the second vehicle 114. For example, this power source connection is not originally designed to supply electrical power, but rather to receive it from the second vehicle 114 for purposes of charging the power source 112. As such, the power source 112 is originally designed to be a power source within the actual first vehicle 102—not supplying electrical power via the connection cord 120.

As discussed above, the connector device 126 may include an arrangement of connectors 132/316 and the housing 131 (outer casing 301). The housing 131/outer casing 301 may have a shape that is designed to correspond to a housing associated with the cord-end connector 116 to ensure that one or more connectors 132/316 of the connector device 126/300 properly align with the connectors 117/362 of the cord-end connector 116/360. In one example, the housing 131/outer casing 301 may be designed to be coupled with the housing of the cord-end connector 116 such that the fit between these two housing may occur when the housing 131/outer casing 301 is orientated in a specific way with respect to the housing of the cord-end connector 116.

Access to a power source included within the first vehicle may be provided (404). For example, the connector device 126/300 may be configured to provide access to the power source 112 included within the first vehicle 102. The connector device 126/300 may be coupled to the cord-end connector 116/360 of the connection cord 120 in a manner that connects the internal wire 119 corresponding to the power source 112 to another internal wire 119, or more generally, provides access to the internal wire 119 corresponding to the power source 112. Because this connection to the power source 112 is active (e.g., the internal wire 119 is an active line at all times or most times), when coupled, the connector device 126/300 may actually receive electrical power from the power source 112 via the connection cord 120.

In some embodiments, electrical power may be re-routed back to the first vehicle (404-1). For instance, the provided access may include re-routing the electrical power back to the first vehicle 102. For example, the connector device 126/300 may be configured to re-route the electrical power back to the first vehicle 102.

In particular, the connector device 126/300 may be configured to re-route the electrical power received from the connector associated with the internal wire 119 corresponding to the power source 112 back to the first vehicle 102 along a different internal wire 119 of the connection cord 120 that may be at least indirectly connected to the external lights 110, for example. In this context, the connector device 126/300 may provide one or more bridges (or connection points) between the connector 117/362 of the cord-end connector 116/360 that is associated with the power source 112 and the connector(s) 117/362 of the cord-end connector 116 that is associated with one or more components 122 such as the external lights 110. The bridges or connections points associated with the connector device 126/300 may be connectors (e.g., 132/316) and/or switches (130 or 302). Therefore, the connector device 126/300 may be configured to receive electrical power from the power source 112 via the connection cord 120, and then re-route the electrical power back to the first vehicle 102 for activating the one or more components 122 on the first vehicle 102.

Power may be provided to an external device coupled to the connector device (404-2). For example, the connector device 126 may be configured to provide electrical power to at least one external device 128 that is coupled to the connector device 126.

The external device 128 may include a phone, smartphone, computer, laptop, tablet, or generally any type of computing device requiring electrical power. For example, the connector device 126 may be configured to be directly or indirectly coupled to the external device 128 via a standard power cord associated with the external device 128, for example. The connector device 126 may be configured to power or charge the external device 128 based on the provided access when coupled to the external device 128 and the cord-end connector 116 of the connection cord 120. For example, the connector device 126 may provide one or more bridges (or connection(s)) between the internal wire 119 or connector 117/362 of the cord-end connector 116 that is associated with the power source 112 and the connector interface unit 133, disposed on the connector device 126, that is configured to connected to the external device 128.

The connector interface unit 133 may be any type of electrical component configured to allow the external device 128 to be connected to the connector device 126. For example, the connector interface unit 133 may be adapted to connect to the external device 128 directly or via a power cord. In one example, the connector interface unit 133 may be configured to receive a power cord associated with the external device 128 via a USB or standard two-prong electrical socket.

Some of the above example embodiments are described as processes or methods depicted as a flowchart. Although the flowchart describes the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. Example embodiments may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. An apparatus comprising:
 a connector device configured to be removably coupled to
  a cord-end connector of a connection cord of a first vehicle designed to be connected to a second vehicle capable of towing the first vehicle, the connector device configured to provide access to a power source included within the first vehicle, the connector device having a housing with a plurality of connectors including a first connector associated with the power source and a second connector associated with a component on the first vehicle, wherein, when the connector device is coupled to the cord-end connector of the connection cord of the first vehicle, the plurality of connectors of the connector device are connected to a plurality of connectors of the cord-end connector, the connector device having a switch, a first terminal extender, and a second terminal extender, each of the first terminal extender and the second terminal extender having a first end portion and a second end portion, the first end portion of the first terminal extender being coupled to the first connector, the first end portion of the second terminal extender being coupled to the second connector, the second end portion of the first terminal extender being coupled to a first terminal of the switch, the second end portion of the second terminal extender being coupled to a second terminal of the switch, the connector device including a base portion having a lumen extending from a first opening to a second opening along a longitudinal axis of the base portion, wherein the switch is partly disposed outside the base portion via the first opening, and the second opening is configured to receive the plurality of connectors of the cord-end connector, the switch having a first operational mode in which the switch is open and a second operational mode in which the switch is closed, wherein actuation of the switch is based on a force applied to the switch by a user of the connector device, wherein, when the switch is in the second operational mode, the connector device is configured to route electrical power from the power source back to the first vehicle for activating the component on the first vehicle.

2. The apparatus of claim 1, wherein the plurality of connectors on the connector device are male connectors, and the plurality of connectors of the cord-end connector are female connectors.

3. The apparatus of claim 1, wherein the component includes external lighting located on the outside of the first vehicle.

4. The apparatus of claim 1, wherein the power source includes a 12-volt battery, the second vehicle is a powered motor vehicle, and the first vehicle is a camper trailer.

5. The apparatus of claim 1, wherein the connector device is also configured to be coupled to a mobile computing device.

6. The apparatus of claim 5, wherein the connector device is configured to power or charge the mobile computing device based on the provided access while activating the component on the first vehicle.

7. The apparatus of claim 6, wherein the connector device includes a connector interface unit configured to be coupled to the mobile computing device, wherein the connector device is configured to power or charge the mobile computing device via the connector interface unit.

8. The apparatus of claim 1,
wherein, when the switch is in the second operational mode, the switch is configured to provide a connection between the first connector and the second connector.

9. The apparatus of claim 1, wherein the housing of the connector device is configured to permit the plurality of connectors of the connector device to be coupled with the plurality of connectors of the cord-end connector when the housing of the connector device is orientated in a certain position with respect to the housing of the cord-end connector.

10. An apparatus comprising:
a connector device configured to be removably coupled to a cord-end connector of a connection cord of a first vehicle designed to be connected to a second vehicle capable of towing the first vehicle, the connector device configured to receive electrical power from a power source included within the first vehicle and re-route the electrical power back to the first vehicle to activate external lighting on the first vehicle, the connector device having a housing with a plurality of connectors including a first connector associated with the power source and a second connector associated with the external lighting, the connector device having a switch, a first terminal extender, and a second terminal extender, each of the first terminal extender and the second terminal extender having a first end portion and a second end portion, the first end portion of the first terminal extender being coupled to the first connector, the first end portion of the second terminal extender being coupled to the second connector, the second end portion of the first terminal extender being coupled to a first terminal of the switch, the second end portion of the second terminal extender being coupled to a second terminal of the switch, the connector device including a base portion having a lumen extending from a first opening to a second opening along a longitudinal axis of the base portion, wherein the switch is partly disposed outside the base portion via the first opening, and the second opening is configured to receive a cord-end connector of the connection cord of the first vehicle, the switch having a first operational mode in which the switch is open and a second operational mode in which the switch is closed, wherein actuation of the switch is based on a force applied by the switch by a user of the connector device, wherein, when the switch is in the second operational mode, the connector device is configured to route the electrical power from the power source back to the first vehicle for activating the external lighting on the first vehicle.

11. The apparatus of claim 10, wherein the power source includes a 12-volt battery.

12. The apparatus of claim 10, wherein the plurality of connectors of the connector device are configured to be coupled with a plurality of connectors of the cord-end connector of the connection cord,
wherein, when the switch is in the second operational mode, the switch is configured to provide a connection between the first connector and the second connector in order to re-route the electrical power to the external lighting.

13. The apparatus of claim 10, wherein the housing of the connection device is configured to permit the plurality of connectors of the connector device to be coupled with the cord-end connector when the housing of the connector device is orientated in a certain position with respect to a housing of the cord-end connector.

14. The apparatus of claim 10, wherein the switch includes a rocker switch coupled to the housing of the connection device, a portion of the rocker switch protruding from an outer surface of the housing.

15. A method for providing access to power included within a vehicle, the method comprising:
- coupling a connector device to a cord-end connector of a connection cord of a first vehicle designed to be connected to a second vehicle capable of towing the first vehicle, the cord-end connector of the connection cord having a housing with a plurality of connectors, the connector device having a housing with a plurality of connectors including a first connector associated with a power source and a second connector associated with a component on the first vehicle,
- the plurality of connectors of the connector device being connected to the plurality of connectors of the cord-end connector, the connector device having a switch, a first terminal extender, and a second terminal extender, each of the first terminal extender and the second terminal extender having a first end portion and a second end portion, the first end portion of the first terminal extender being coupled to the first connector, the first end portion of the second terminal extender being coupled to the second connector, the second end portion of the first terminal extender being coupled to a first terminal of the switch, the second end portion of the second terminal extender being coupled to a second terminal of the switch, the switch having a first operational mode in which the switch is open and a second operational mode in which the switch is closed, the connection device including a base portion having a lumen extending from a first opening to a second opening along a longitudinal axis of the base portion, wherein the switch is partly disposed outside the base portion via the first opening, and the second opening is configured to receive the plurality of connectors of the cord-end connector; and
- providing access to the power source included within the first vehicle by switching the switch from the first operation mode to the second operational mode based on a force applied to the switch by a user of the connector device such that electrical power is routed from the power source back to the first vehicle for activating the component on the first vehicle.

16. The method of claim 15, wherein the component includes external lighting associated with the first vehicle.

17. The method of claim 15, further comprising:
- coupling a mobile computing device to the connector device;
- charging a battery of the mobile computing device based on the power source of the first vehicle while activating the component on the first vehicle.

* * * * *